UNITED STATES PATENT OFFICE.

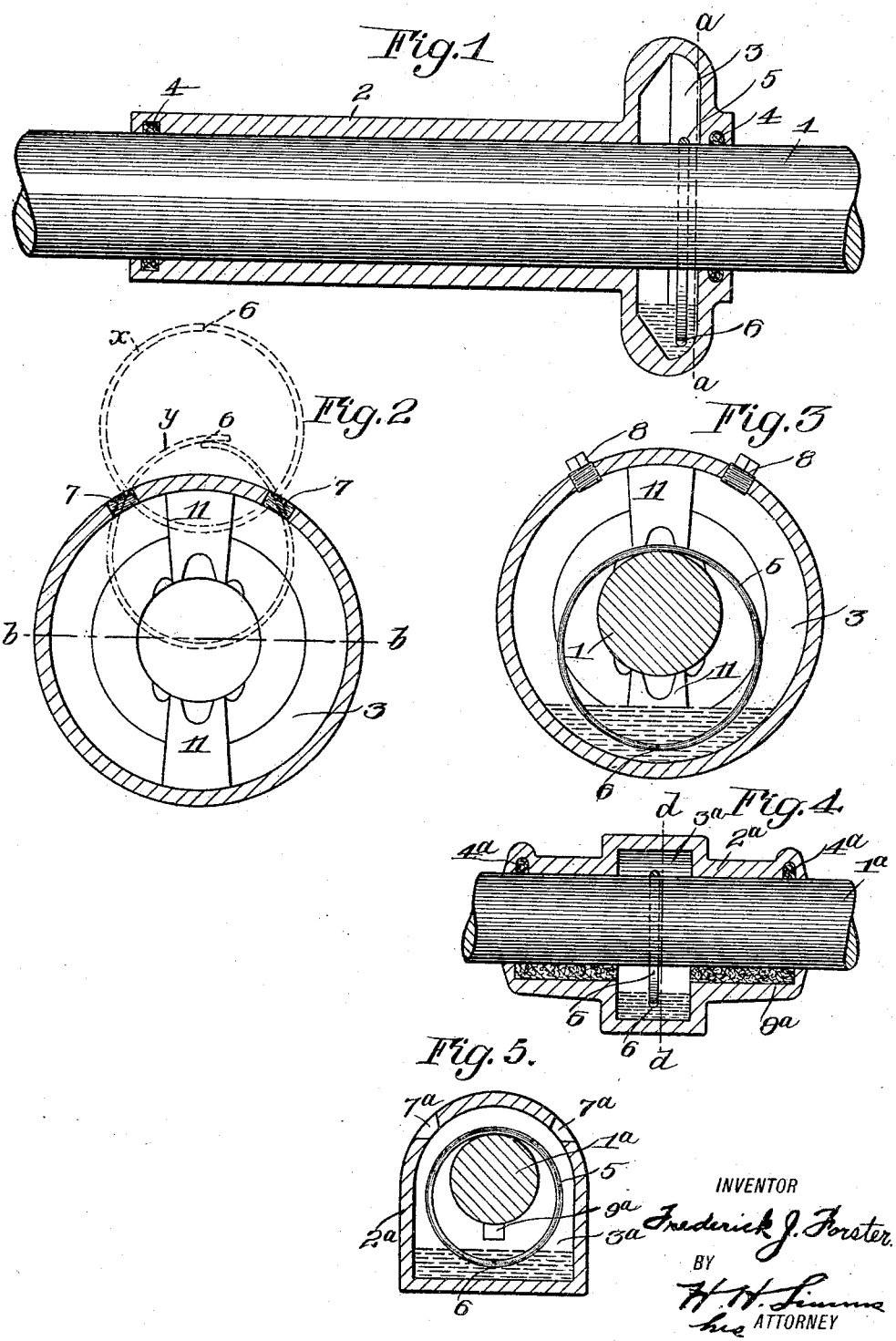

FREDERICK J. FORSTER, OF ROCHESTER, NEW YORK.

BEARING.

1,198,630.

Specification of Letters Patent.

Patented Sept. 19, 1916.

Application filed September 20, 1915. Serial No. 51,549.

*To all whom it may concern:*

Be it known that I, FREDERICK J. FORSTER, of Rochester, in the county of Monroe, State of New York, have invented a new and useful Bearing, fully set forth in the following specification and shown in the accompanying drawings.

The present invention relates to bearings and more particularly to that type in which a casing surrounds a shaft and has an oil well or chamber in which is contained a ring lying about the shaft for the purpose of conducting the lubricant to the shaft bearing and an object of this invention is to provide a construction which will permit the surrounding casing to be formed on one piece and the ring to be introduced therein after the casing is formed, thus dispensing with the usual operation of casting the ring within the oil chamber.

To these and other ends the invention consists in certain parts and combinations of parts all of which will be hereinafter described, the novel features being pointed out in the appended claims.

In the drawings: Figure 1 is a longitudinal section through the casing of one embodiment of the invention in which the casing is in the form of a bushing for pulleys; Fig. 2 illustrates the manner in which the ring is introduced into the lubricant chamber; Fig. 3 is a section on the line $a$—$a$, Fig. 1; Fig. 4 is a longitudinal section through a modification of the invention in which the surrounding casing is in the form of a stationary bearing member with the shaft turning therein; Fig. 5 is a section on the line $d$—$d$, Fig. 4.

In bearings of the type employing a ring operating in a lubricant or oil chamber, it has heretofore, been necessary, when the casing in which the lubricant chamber is formed in a single casting, to cast the ring within the lubricant chamber while the casing is being cast. This operation is not only expensive but, at the same time, there is a good deal of waste due to imperfections in the ring. Both of these disadvantages are overcome by the present invention where a ring is split and is introduced through one or more openings after the casing has been cast.

In the embodiment of the invention illustrated in Figs. 1 to 3, the casing is in the form of a bushing for a pulley with a nonrotating shaft 1. The casing embodies an elongated bearing portion 2 and the well or chamber 3 at one end of the bearing portion. At each end of the casing, annular internal grooves are formed for the reception of packings 4 which confine the oil to the bearing casing. Within this oil or lubricant chamber 3, a ring 5 is arranged, this ring being preferably made of spring material and split at 6. It is introduced within the oil chamber 3 after the casing has been cast and this introduction is preferably effected by providing the casing with openings 7 leading into the oil chamber and separated a distance slightly less than the diameter of the ring in order that the ring may be first threaded or laced through the two openings to the position shown at $x$ in Fig. 2, then compressed and shifted to the position shown at $y$ in Fig. 2, after which it may be expanded and passed through both openings to occupy the position shown in Fig. 3, it being understood that the ring is inserted before the bushing is applied to the shaft. As the bushing 2 rotates, it is desirable to close the openings 7 by screw plugs 8 to prevent the escape of oil from the lubricant chamber 3.

In the embodiment shown in Figs. 4 and 5, the casing $2^a$ is a stationary bearing sleeve in which the shaft $1^a$ turns. The oil well $3^a$ is formed about midway between the ends of the bearing and this well has two openings $7^a$ in its top wall, said openings not requiring any plugs as the bearing sleeve does not rotate. The ring 5 is split at 6 and is introduced in the same manner as the embodiment shown in Figs. 1 to 4. The casing $2^a$ has internal grooves $4^a$ at opposite ends and longitudinal grooves $9^a$ connecting the grooves $4^a$ with the well $3^a$.

In both embodiments of the invention, the split resilient ring is distorted and passed into an oil well or chamber formed in a single casting in order that the ring will surround a shaft passed through the casing.

What I claim as my invention and desire to secure by Letters Patent is:

1. A bearing comprising a shaft, a single casting having two spaced, continuous, bearing surfaces on its inner walls engaging said shaft and an oil chamber between said surfaces extending completely about the shaft, and a split resilient ring arranged within the chamber, the wall of said chamber having at least one opening through which the ring is threaded to enter the chamber, the opening being smaller than the diameter of the ring.

2. A bearing comprising a shaft, a casting formed in one piece about the shaft and having an oil chamber and also interior walls serving as bearing surfaces, the oil chamber being provided with two spaced openings between the bearing surfaces, and a split oiling ring arranged in said oil chamber, the openings being so located that the ring may be threaded through them into the oil chamber.

3. A bearing comprising a shaft, a bearing member surrounding the shaft and having an oil chamber, said member having two openings in said chamber, and a split resilient ring arranged in the oil chamber, the diameter of the ring being greater than the distance between the openings.

FREDERICK J. FORSTER.

Copies of this patent may be obtained for five cents each, by addressing the "Commissioner of Patents, Washington, D. C."